(12) United States Patent  
Lee

(10) Patent No.: US 12,381,455 B2  
(45) Date of Patent: Aug. 5, 2025

(54) HAPTIC POWER CONTROL TECHNIQUES FOR HAPTIC SYSTEMS

(71) Applicant: Apple Inc., Cupertino, CA (US)

(72) Inventor: Juil Lee, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 18/472,148

(22) Filed: Sep. 21, 2023

(65) Prior Publication Data

US 2024/0113599 A1 Apr. 4, 2024

Related U.S. Application Data

(60) Provisional application No. 63/376,970, filed on Sep. 23, 2022.

(51) Int. Cl.
| | |
|---|---|
| *H04B 3/36* | (2006.01) |
| *H02K 11/25* | (2016.01) |
| *H02K 11/26* | (2016.01) |
| *G06F 3/01* | (2006.01) |

(52) U.S. Cl.
CPC ............. *H02K 11/26* (2016.01); *H02K 11/25* (2016.01); *G06F 3/016* (2013.01)

(58) Field of Classification Search
CPC .......... H02K 11/26; H02K 11/25; G06F 3/016
See application file for complete search history.

(56) References Cited

U.S. PATENT DOCUMENTS

| 10,421,100 B2* | 9/2019 | Houston ................ G01C 21/20 |
| 2018/0059792 A1* | 3/2018 | Hajati ................. G06F 3/04886 |
| 2021/0175831 A1* | 6/2021 | Chen .................... H02P 25/086 |
| 2022/0397960 A1* | 12/2022 | Marks ................. G06F 3/03547 |

OTHER PUBLICATIONS

Ho et al., "The Apple Watch Review", AnandTech [online]. Jul. 20, 2015, 10 pages, [retrieved on Jul. 18, 2024]. Retrieved from the Internet: <URL: https://www.anandtech.com/show/9381/the-apple-watch-review/9>.

* cited by examiner

*Primary Examiner* — Toan N Pham
(74) *Attorney, Agent, or Firm* — Kubota & Basol LLP

(57) ABSTRACT

Haptic power control techniques provide improved power control for the haptic generator to reduce deficiencies of operation and/or increase performance of the haptic generator across various thermal conditions. In some examples, a first resistance measurement can be obtained and used for estimating an actuation voltage limit for the haptic generator. In some examples, estimating the actuation voltage limit for the haptic generator using the first resistance measurement includes estimating a first actuation voltage limit for the haptic generator when the first resistance measurement is a first resistance value and estimating a second actuation voltage limit for the haptic generator when the first resistance measurement is a second resistance value.

20 Claims, 5 Drawing Sheets

HAPTIC POWER CONTROL TECHNIQUES FOR HAPTIC SYSTEMS

CROSS-REFERENCE TO RELATED APPLICATIONS

This application claims the benefit of U.S. Provisional Application No. 63/376,970, filed Sep. 23, 2022, the content of which is incorporated in its entirety for all purposes.

FIELD OF THE DISCLOSURE

This relates generally to systems and methods for haptic systems, and more particularly, to techniques for power control of a haptic generator of a haptic system.

BACKGROUND OF THE DISCLOSURE

Many types of electronic devices include a haptic system for generating haptic feedback. For example, a haptic system may be used to provide haptic feedback to a user of an electronic device.

SUMMARY OF THE DISCLOSURE

Many types of electronic devices include a haptic system for generating haptic feedback. For example, a haptic system may be used to provide haptic feedback (e.g., an alert) to a user of an electronic device. A haptic power performance of a haptic generator of a haptic system can be or become over-budget of a power budget for the haptic generator due to a relatively lower resistivity of one or more coils of the haptic generator (e.g., lower than a resistivity of the one or more coils estimated at factory) when the haptic generator or the electronic device is in a first set of thermal conditions, such as low temperatures. Further, a haptic peak power performance of a haptic generator may be or become under-budget of the power budget for the haptic generator due to a relatively higher resistivity of one or more coils of the haptic generator when the haptic generator or the electronic device is in a second set of thermal conditions, such as at higher temperatures. The over-utilized or under-utilized power of the haptic generator may degrade performance. In some examples, a disclosed haptic power control technique provides consistent power control for the haptic generator to improve performance of the haptic generator across various thermal conditions, such as across the first set of thermal conditions and/or the second set of thermal conditions.

DETAILED DESCRIPTION

In the following description of examples, reference is made to the accompanying drawings which form a part hereof, and in which it is shown by way of illustration specific examples that are optionally practiced. It is to be understood that other examples are optionally used and structural changes are optionally made without departing from the scope of the disclosed examples.

Many types of electronic devices include a haptic system for generating haptic feedback. For example, a haptic system may be used to provide haptic feedback (e.g., an alert) to a user of an electronic device. A haptic power performance of a haptic generator of a haptic system can be or become over-budget of a power budget for the haptic generator due to a relatively lower resistivity of one or more coils of the haptic generator (e.g., lower than a resistivity of the one or more coils estimated at factory) when the haptic generator or the electronic device is in a first set of thermal conditions, such as low temperatures. Further, a haptic peak power performance of a haptic generator may be or become under-budget of the power budget for the haptic generator due to a relatively higher resistivity of one or more coils of the haptic generator when the haptic generator or the electronic device is in a second set of thermal conditions, such as at higher temperatures. The over-utilized or under-utilized power of the haptic generator may degrade performance. In some examples, a disclosed haptic power control technique provides consistent power control for the haptic generator to improve performance of the haptic generator across various thermal conditions, such as across the first set of thermal conditions and/or the second set of thermal conditions.

Some Exemplary Electronic Devices

FIGS. 1A-1E illustrate exemplary electronic devices with a haptic system that implements a haptic power control technique (e.g., a haptic peak power control technique) in accordance with some examples of the present disclosure. It is understood that the heat-generating component noise correction techniques disclosed with reference to FIGS. 2-7 are optionally adaptable to the exemplary electronic devices described with reference to FIGS. 1A-1E.

Figure 1A:
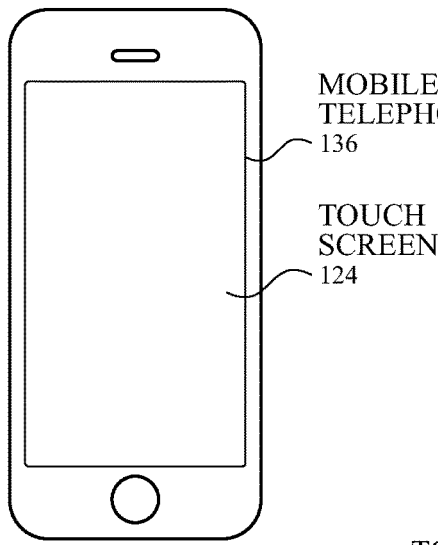
FIGS. 1A-E illustrate various electronic devices with a haptic system that implement a haptic power control technique in accordance with some examples of the present disclosure.

FIG. 1A illustrates a mobile telephone 136 that includes a touch screen 124. The mobile telephone 136 includes a haptic system that implements a haptic power control technique in accordance with some examples of the present disclosure.

Figure 1B:
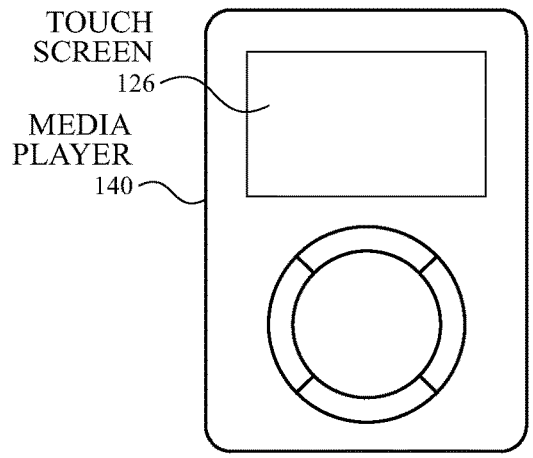

FIG. 1B illustrates a media player 140 (e.g., a digital media player) that includes a touch screen 126. The media player 140 includes a haptic system that implements a haptic power control technique in accordance with some examples of the present disclosure.

Figure 1C:
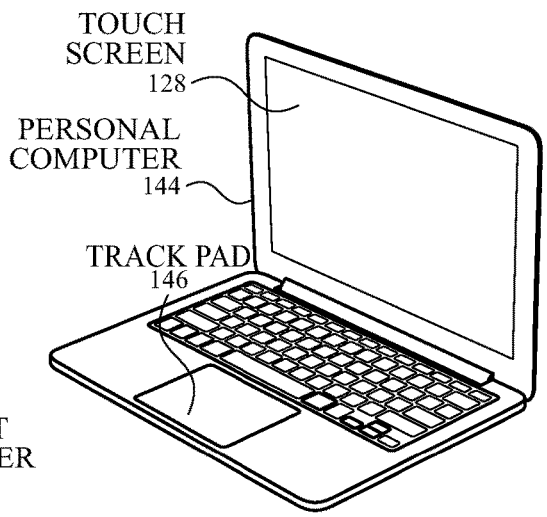

FIG. 1C illustrates a personal computer 144 that includes a touch screen 128 and a track pad 146. The personal computer 144 includes a haptic system that implements a haptic power control technique in accordance with some examples of the present disclosure.

Figure 1D:
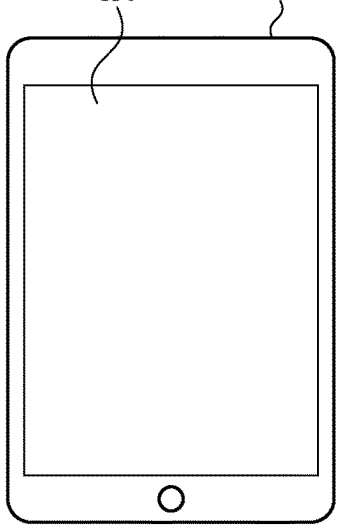

FIG. 1D illustrates a tablet computer 148 that includes a touch screen 130. The tablet computer 148 includes a haptic system that implements a haptic power control technique in accordance with some examples of the present disclosure.

Figure 1E:
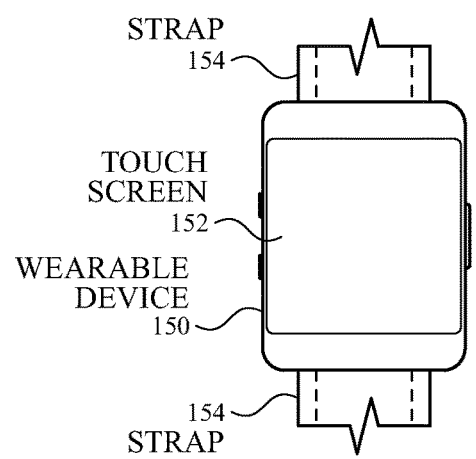

FIG. 1E illustrates a wearable device 150 (e.g., a watch) that includes a touch screen 152. The wearable device 150 includes a coupling mechanism (e.g., a strap 154, a suitable fastener) for coupling the wearable device 150 to a user of the wearable device 150. The wearable device 150 includes a haptic system that implements a haptic power control technique in accordance with some examples of the present disclosure.

In some examples, the haptic system within the mobile telephone 136, the media player 140, the personal computer 144, or the tablet computer 148 may provide haptic feedback to a user of the devices.

It should be understood that the exemplary electronic devices illustrated in FIGS. 1A-1E are provided by way of example and are non-limiting, and other types of electronic devices may include a haptic system that implements a haptic power control technique as described herein. For example, the electronic devices can include devices worn on or placed into contact with the face, the head, or the fingers of a user (or at another location on a user's body). The electronic devices can include over-ear headphones, glasses, head bands, chest straps, wrist straps, rings, etc. For example, glasses worn on a user's face can include a haptic system that implements a disclosed haptic power control technique and provides haptic feedback to the user, such as a to the user's (sensation at) temples, forehead, or nose, among other possibilities. In a similar manner, a head band, chest strap or ring can include a haptic system. Additionally, in some examples, less or more components of the exemplary electronic devices illustrated in FIGS. 1A-1E are included in an electronic device that includes a haptic system.

Figure 2:
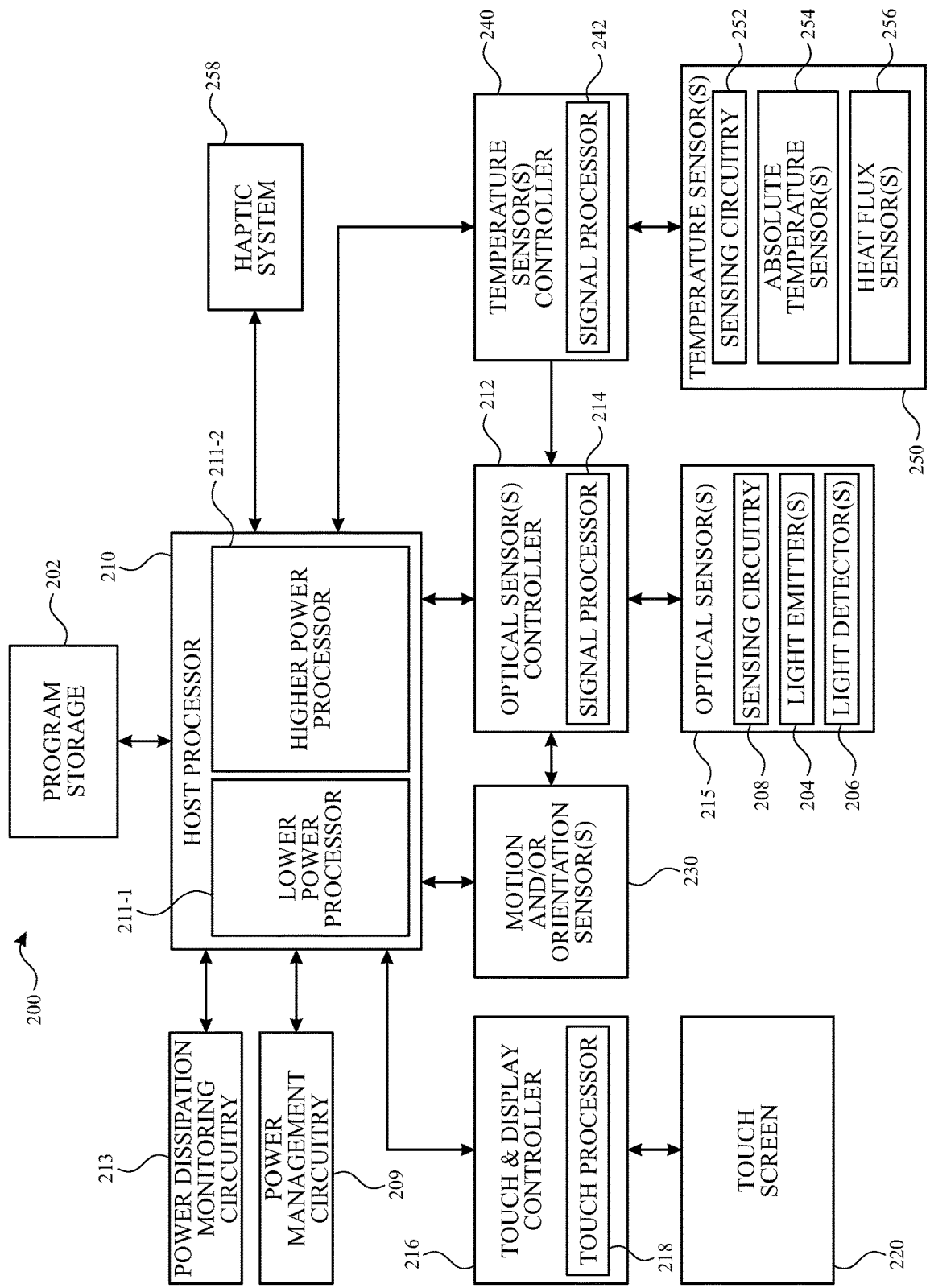
FIG. 2 illustrates a block diagram of an electronic device that includes a haptic system that implements a haptic power control technique in accordance with some examples of the present disclosure.

FIG. 2 illustrates a block diagram of a computing system 200 that includes a haptic system that implements a haptic power control technique in accordance with some examples of the present disclosure. Computing system 200 can correspond to mobile telephone 136, media player 140, personal computer 144, tablet computer 148, or wearable device 150 illustrated in FIGS. 1A-1E (or may be implemented in other wearable or non-wearable electronic devices). In some examples, one or more components of the computing system 200 are utilized in performance of the haptic power control technique.

Computing system 200 includes a host processor 210 (or more than one processor) programmed to (configured to) execute instructions and to carry out operations associated with computing system 200. For example, using instructions retrieved from a program storage 202, host processor 210 can control the reception and manipulation of input and output data between components of computing system 200. Host processor 210 can be a single-chip processor (e.g., an application specific integrated circuit) or can be implemented with multiple components/circuits. For example, FIG. 2 illustrates the host processor 210 including a relatively lower power processor 211-1 and a relatively higher power processor 211-2, as described in more detail herein.

In some examples, host processor 210, together with an operating system can operate to execute computer code/programs, and produce and/or use data. The computer code and data can reside within the program storage 202 that can be operatively coupled to host processor 210. Program storage 202 can generally provide a place to hold data used by computing system 200. Program storage 202 can be any non-transitory computer-readable storage medium. By way of example, program storage 202 can include Read-Only Memory (ROM), Random-Access Memory (RAM), hard disk drive and/or the like. The computer code and data could also reside on a removable storage medium and loaded or installed onto computing system 200 when needed. Removable storage mediums include, for example, CD-ROM, DVD-ROM, Universal Serial Bus (USB), Secure Digital (SD), Compact Flash (CF), Memory Stick, Multi-Media Card (MMC) and/or a network component.

As described herein, in some examples, host processor 210 can represent multiple processors, such as lower power processor 211-1 and higher power processor 211-2. Lower power processor 211-1 and higher power processor 211-2 can represent separate processing chips, each with independent timing and power requirements. For example, lower power processor 211-1 can operate using a first clock signal and at a first power level that allows processor 211-1 to remain operational ("on") across most or all operating modes of computing system 200 (e.g., a sleep mode, awake mode, idle mode, etc.). By contrast, higher power processor 211-2 can operate using a second clock signal (e.g., a higher frequency clock), different from the first, or at a second power level, higher than the first. Because of the higher power requirements of higher power processor 211-2, host processor 210 (e.g., an operating system on host processor 210) can selectively disable, or power down higher power processor 211-2 or otherwise throttle its power consumption during certain operating modes of computing system 200 (e.g., a power saving mode, sleep mode, etc.). In some examples, as described herein, the higher power processor 211-2 can be powered down or otherwise throttle its power consumption to enable temperature measurements without error introduced by the power dissipation by higher power processor 211-2.

Lower power processor 211-1 and/or higher power processor 211-2 can interface with various sensors of computing system 200 including a touch sensor panel and/or a touch screen 220 (via touch and display controller 216), motion and/or orientation sensor(s) 230, optical sensor(s) 215 (via optical sensor controller 212), and temperature sensor(s) 250 (via temperature sensor(s) controller 240). In some examples, lower power processor 211-1 can operate in a sleep mode or a power-saving mode, while higher power processor 211-2 is powered down. In some examples, lower power processor 211-1 can change an operating mode of computing system 200 or otherwise cause higher power processor 211-2 to be powered on (e.g., when wake up conditions are detected).

Computing system 200 can also include power management circuitry 209 and/or power dissipation monitoring circuitry 213. Host processor 210 (e.g., lower power processor 211-1 and/or higher power processor 211-2) can be coupled to power management circuitry 209 and/or power dissipation monitoring circuitry 213. Power management circuitry 209 can regulate power delivery from power supply circuitry (e.g., a battery, or another power source of computing system 200) to various components of computing system 200 (e.g., sensors, processors, antennas, displays, etc.). As an example, power management circuitry 209 can interrupt or throttle power delivery to components that generate heat within computing system 200 (e.g., heat-generating components, thermal aggressors), especially to ensure proper performance, keep the computing system in safe operating conditions, or during temperature measurements that may be sensitive to heat from such components. Power management circuitry 209 can monitor temperatures inside a housing of computing system 200 and/or temperatures outside the housing. In some examples, power management circuitry 209 provides control signals to inline switches coupled between the power supply circuitry of computing system 200 and various components of computing system 200, where the control signals determine an amount of current or power that can be delivered to the respective components. As an example, power management circuitry 209 can provide a first control signal to a switch interposed between a battery power source of computing system 200 and touch screen 220, such that the first control signal limits the amount of power or current delivered to the touch screen by the battery power source. As another example, power management circuitry 209 can provide a second control signal to a switch interposed between a battery power source of computing system 200 and antenna circuitry (not shown) of the system, such that the second control signal interrupts power delivery or current flow between the battery power source and the antenna circuitry.

Power dissipation monitoring circuitry 213 can monitor power supply circuitry of computing system 200, and can regulate power delivery from the power supply circuitry (not shown) to various components of computing system 200 (e.g., by sending instructions to power management circuitry 209). In some examples, power dissipation monitoring circuitry 213 includes a sensor coupled to the power supply circuitry (e.g., battery) of computing system 200. The sensor can measure power drawn by components of computing system 200 from the power supply circuitry (e.g., a battery of computing system 200). In some examples, the power draw by components of the computing system 200 can be estimated based on a current draw from the power supply circuitry. In some examples, the power drawn can be estimated on a device basis (e.g., estimated current draw from the battery).

In some examples, computing system 200 includes one or more input/output (I/O) controllers that can be operatively coupled to host processor 210. I/O controllers can be configured to control interactions with one or more I/O devices (e.g., touch sensor panels, display screens, touch screens, physical buttons, dials, slider switches, joysticks, or keyboards). I/O controllers can operate by exchanging data between host processor 210 and the I/O devices that desire to communicate with host processor 210. The I/O devices and I/O controller can communicate through a data link. The data link can be a unidirectional or bidirectional link. In some cases, I/O devices can be connected to I/O controllers through wireless connections. A data link can, for example, correspond to any wired or wireless connection including, but not limited to, PS/2, Universal Serial Bus (USB), Firewire, Thunderbolt, Wireless Direct, IR, RF, Wi-Fi, BLUETOOTH, or the like.

In the illustrated example, computing system 200 includes a temperature sensor(s) controller 240 operatively coupled to host processor 210 and to temperature sensor(s) 250 (e.g., one or more temperature sensors). Also, the temperature sensor controller 240 is coupled to optical sensor controller 212. The temperature sensor(s) 250 include one or more absolute temperature sensor(s) 254, one or more heat flux sensor(s) 256, and sensing circuitry 252 (e.g., analog and/or digital circuitry to: measure signals at the one or more absolute temperature sensor(s) 254 and/or one or more heat flux sensor(s) 256; provide processing (e.g., amplification, filtering, level-shifting); and convert analog signals to digital signals for performing temperature and/or heat-flux sensing measurements). As an example, the one or more absolute temperature sensor(s) 254 and one or more heat flux sensor(s) 256 may be configured to measure temperature at various locations within the computing system 200, including at least one location or region inside the wearable device different than a location or region in which an absolute temperature sensor is disposed for the computing system 200. These temperatures and/or heat flux measurements can be used to measure temperature characteristics of the device under various modes of operation (e.g., to estimate when temperatures within a device are approaching unsafe or unsustainable levels), to estimate ambient temperatures outside the device, or to estimate a physiological signal associated with a user (e.g., a body temperature of the user). In some examples, the temperatures sensor(s) 250 include one or more absolute temperature sensor(s) 254 without including one or more heat flux sensor(s) 256. In some examples, the temperature sensor(s) 250 include one or more heat flux sensor(s) 256, without including one or more absolute temperatures sensor(s) 254.

Measured raw data from the absolute temperature sensors 254, heat flux sensor(s) 256, and sensing circuitry 252 can be transferred to the host processor 210 (via temperature sensor(s) controller 240), and the host processor 210 can perform signal processing to estimate internal or external temperatures and/or to estimate physiological signals (e.g., body temperature associated with the user). Host processor 210 and/or temperature sensor controller 240 can operate temperature sensor(s) 250 to measure temperature values associated with computing system 200, and to estimate temperature values associated with the environment external to the system. In some examples, temperature sensor(s) controller 240 can include signal processor 242 to sample, filter, and/or convert (from analog to digital) signals generated by various temperature sensor(s) 250, which can be positioned at different locations within a housing for the computing system 200. In some examples, signal processor 242 is a digital signal processing circuit such as a digital signal processor (DSP). In some examples, the analog data measured by the temperature sensor(s) 250 can be converted into digital data by an analog to digital converter (ADC). In some examples, the digital data from the temperature sensors can be stored for processing in a buffer (e.g., a first-in-first-out (FIFO) buffer) or other volatile or non-volatile memory (not shown) in temperature sensor(s) controller 240. In some examples, host processor 210 and/or temperature sensor(s) controller 240 can store the raw data and/or processed information in memory (e.g., ROM or RAM) for historical tracking or for future diagnostic purposes. In some examples, the temperature sensor(s) 250 can include a negative temperature coefficient (NTC) temperature sensor, a resistance temperature detector (RTD), or a diode based temperature sensor.

In the illustrated example, computing system 200 includes an optical sensor(s) controller 212 operatively coupled to host processor 210 and to one or more optical sensors 215. As illustrated, in some examples, the optical sensor(s) 211 include light emitter(s) 204, light detector(s) 206, and sensing circuitry 208 (e.g., analog circuitry to drive emitters and measure signals at the detector, provide processing (e.g., amplification, filtering), and convert analog signals to digital signals). As an example, light emitters 204 and light detectors 206 can be configured to generate and emit light into a user's skin and detect returning light (e.g., reflected and/or scattered) to measure a physiological signal (e.g., a photoplethysmogram (PPG) signal), respectively. The absorption and/or return of light at different wavelengths can also be used to determine a characteristic of the user (e.g., oxygen saturation, heart rate) and/or about the contact condition between the light emitter(s) 204/light detector(s) 206 and the user's skin. Measured raw data from the light emitter(s) 204, light detector(s) 206, and sensing circuitry 208 can be transferred to host processor 210, and host processor 210 can perform the signal processing described herein to estimate a characteristic (e.g., oxygen saturation, heart rate, etc.) of the user of the example electronic device from the physiological signals. Host processor 210 and/or optical sensor(s) controller 212 can operate light emitter(s) 204, light detector(s) 206 and/or sensing circuitry 208 to measure data from the optical sensor. In some examples, optical sensor controller(s) 212 can include timing generation for light emitters 204, light detectors 206 and/or signal processor 214 to sample, filter and/or convert (from analog to digital) signals measured from light at different wavelengths. Optical sensor(s) controller 212 can process the data in signal processor 214 and report outputs (e.g., PPG signal, relative modulation ratio, perfusion index, heart rate, on-wrist/off-wrist state, etc.) to the host processor 210. Signal processor 214 can be a digital signal processing circuit such as a digital signal processor (DSP). The analog data measured by the optical sensor(s) 211 can be converted into digital data by an analog to digital converter (ADC), and the digital data from the physiological signals can be stored for processing in a buffer (e.g., a FIFO) or other volatile or non-volatile memory (not shown) in optical sensor(s) controller 212. In some examples, some light emitters and/or light detectors can be activated, while other light emitters and/or light detectors can be deactivated (by power management circuitry 209) to conserve power, for example, or for time-multiplexing (e.g., to avoid interference between channels). In some examples, host processor 210 and/or optical sensor(s) controller 212 can store the raw data and/or processed information in memory (e.g., ROM or RAM) for historical tracking or for future diagnostic purposes.

In the illustrated example, computing system 200 includes one or more motion and/or orientation sensor(s) 230. The one or more motion and/or orientation sensor(s) 230 optionally includes an accelerometer (e.g., a multi-channel accelerometer (e.g., a 3-axis accelerometer), a gyroscope, and/or an inertia-measurement unit (IMU)).

In the illustrated example, computing system 200 includes a touch and display controller 216 operatively coupled to host processor 210 and to touch screen 220. Touch screen 220 can be configured to display visual output in a graphical user interface (GUI), for example. The visual output can include text, graphics, video, and any combination thereof. In some examples, the visual output can include a text or graphical representation of the physiological signal (e.g., a PPG waveform) or a characteristic of the physiological signal (e.g., oxygen saturation, heart rate, temperature, etc.) Touch screen can be any type of display including a liquid crystal display (LCD), a light emitting polymer display (LPD), an electroluminescent display (ELD), a field emission display (FED), a light emitting diode (LED) display, an organic light emitting diode (OLED) display, or the like. Host processor 210 can send raw display data to touch and display controller 216, and touch and display controller 216 can send signals to touch screen 220. Data can include voltage levels for a plurality of display pixels in touch screen 220 to project an image. In some examples, host processor 210 can be configured to process the raw data and send the signals to touch screen 220 directly. Touch and display controller 216 can also detect and track touches or near touches (and any movement or release of the touch) on touch screen 220. For example, touch processor 218 can process data representative of touch or near touches on touch screen 220 (e.g., location and magnitude) and identify touch or proximity gestures (e.g., tap, double tap, swipe, pinch, reverse-pinch, etc.). Host processor 210 can convert the detected touch input/gestures into interaction with graphical objects, such as one or more user-interface objects, displayed on touch screen 220 or perform other functions (e.g., to initiate a wake of the device or power on one or more components).

In some examples, touch and display controller 216 can be configured to send raw touch data to host processor 210, and host processor 210 can process the raw touch data. In some examples, touch and display controller 216 can process raw touch data via touch processor 218. The processed touch data (touch input) can be transferred from touch processor 218 to host processor 210 to perform the function corresponding to the touch input. In some examples, a separate touch sensor panel and display screen can be used, rather than a touch screen, with corresponding touch controller and display controller.

In some examples, the touch sensing of touch screen 220 can be provided by capacitive touch sensing circuitry (e.g., based on mutual capacitance and/or self-capacitance). For example, touch screen 220 can include touch electrodes arranged as a matrix of small, individual plates of conductive material or as drive lines and sense lines, or in another pattern. The electrodes can be formed from a transparent conductive medium such as Indium Tin Oxide (ITO) or Antimony Tin Oxide (ATO), although other partially or fully transparent and non-transparent materials (e.g., copper) can also be used. In some examples, the electrodes can be formed from other materials including conductive polymers, metal mesh, graphene, nanowires (e.g., silver nanowires) or nanotubes (e.g., carbon nanotubes). The electrodes can be configurable for mutual capacitance or self-capacitance sensing or a combination of mutual and self-capacitance sensing. For example, in one mode of operation, electrodes can be configured to sense mutual capacitance between electrodes; in a different mode of operation, electrodes can be configured to sense self-capacitance of electrodes. During self-capacitance operation, a touch electrode can be stimulated with an AC waveform, and the self-capacitance to ground of the touch electrode can be measured. As an object approaches the touch electrode, the self-capacitance to ground of the touch electrode can change (e.g., increase). This change in the self-capacitance of the touch electrode can be detected and measured by the touch sensing system to determine the positions of one or more objects when they touch, or come in proximity to without touching, the touch screen. During mutual capacitance operation, a first touch electrode can be stimulated with an AC waveform, and the mutual capacitance between the first touch electrode and a second touch electrode can be measured. As an object approaches the overlapping or adjacent region of the first and second touch electrodes, the mutual capacitance therebetween can change (e.g., decrease). This change in the mutual capacitance can be detected and measured by the touch sensing system to determine the positions of one or more objects when they touch, or come in proximity to without touching, the touch screen. In some examples, some of the electrodes can be configured to sense mutual capacitance therebetween and some of the electrodes can be configured to sense self-capacitance thereof.

In the illustrated example, the computing system 200 includes a haptic system 258 that is communicatively coupled to the host processor 210. The haptic system 258 implements a haptic power control technique in accordance with some examples of the present disclosure. In some examples, power dissipation monitoring circuitry 213 and/or power management circuitry 209 can provide data regarding a power budget to a haptic system 258 or implement at least a portion of the haptic power control techniques described herein.

It should be noted that one or more of the functions described herein, including a haptic power control technique according to examples of this present disclosure, can be performed by firmware stored in memory (or in program storage 202) and executed by the host processor 210, the power management circuitry 209, the power dissipation monitoring circuitry 213, and/or the haptic system 258. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this disclosure, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
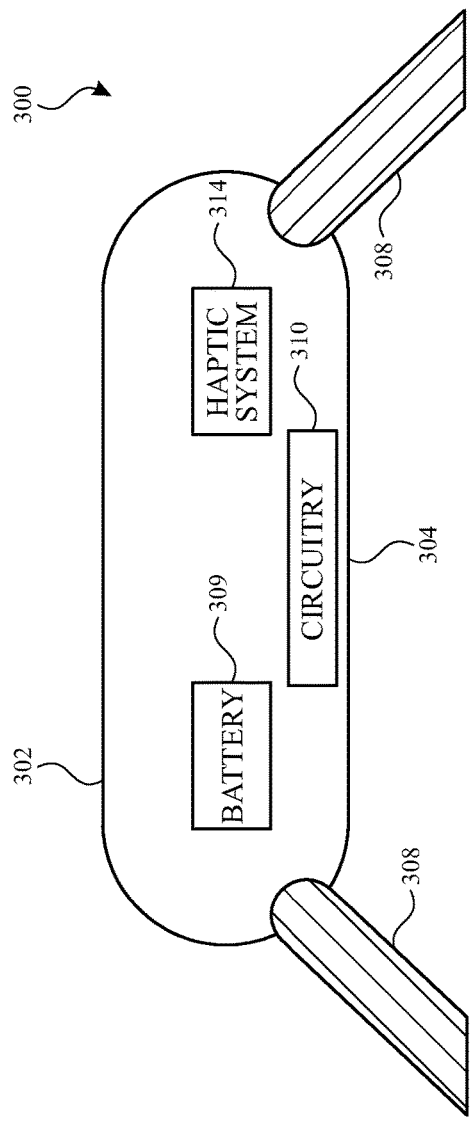
FIG. 3 illustrates a partial cross-sectional side view of an exemplary electronic device that includes a haptic system that implements a haptic power control technique in accordance with some examples of the present disclosure.

FIG. 3 illustrates a partial cross-sectional side view of an exemplary electronic device 300 that includes a haptic system that implements a haptic power control technique, in accordance with some examples of the present disclosure.

Electronic device 300 optionally corresponds to a wearable device 150 of FIG. 1E (or more generally optionally corresponds to any of the electronic devices illustrated by FIGS. 1A-1E). Electronic device 300 optionally corresponds to a watch, a fitness tracker, or any other device. In some examples, electronic device 300 can be secured to or otherwise placed in contact with a user (e.g., exposed skin on the user's body). Electronic device 300 can be attached to any part of the user (e.g., wrist, arm, head, etc.) that is suitable for providing haptic output to the user.

In the illustrated example, the electronic device 300 includes a front face 302 (e.g., a front crystal), a back face 304 (e.g., a back crystal), a housing 306, and straps 308. The electronic device 300 also includes a battery 309, circuitry 310 (optionally representative of both circuitry and other components), and a haptic system 314. The battery 309 optionally provides power for operations of the electronic device 300. The circuitry 310 optionally includes one or more components of the computing system 200 described with reference to FIG. 2. For example, the circuitry 310 optionally includes the host processor 210, touch and display controller 216, optical sensor(s) controllers, temperature sensor(s) controller 240, in addition to or alternative to other components of the computing system 200 described above and/or illustrated in FIG. 2. In addition, in some examples, the circuitry 310 includes a graphical processing unit (GPU) and wireless communication circuitry, a system-on-chip (SoC), a power management unit (PMU), optionally in addition to other components.

The haptic system 314 optionally includes a haptic generator that draws current during operations of the electronic device 300.

It should be noted that the elements of the electronic device 300 including the number of elements illustrated, placement of elements, and distribution of elements shown in FIG. 3 is representative and non-limiting.

Haptic Control Systems in Some Examples

Figure 4:
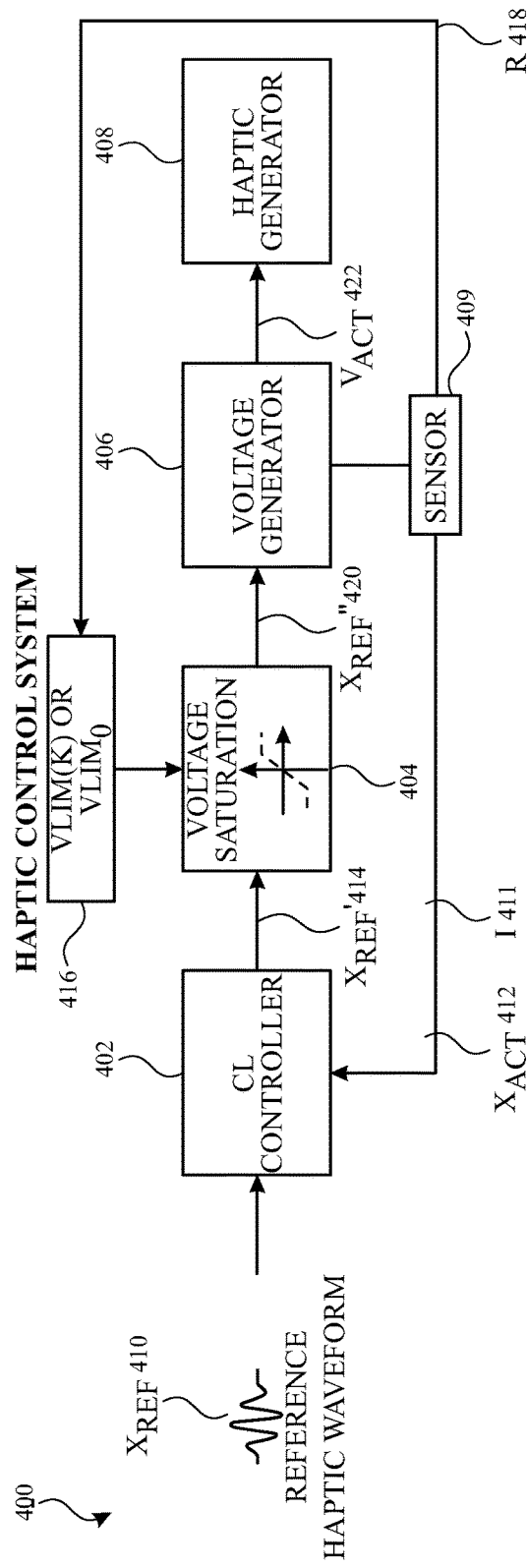
FIG. 4 illustrates a block diagram of a haptic control system that implements a haptic power control technique in accordance with some examples of the present disclosure.

FIG. 4 illustrates a block diagram of a haptic control system 400 (e.g., a haptic power control system, the haptic system 258 of FIG. 2, the haptic system 314 of FIG. 3) that implements a haptic power control technique, in accordance with some examples of the present disclosure.

The haptic control system 400 includes a closed-loop (CL) controller 402, a voltage saturation circuit 404, a voltage generator 406, and a haptic generator 408 (e.g., a haptic engine, a haptic actuator). The haptic control system 400 of FIG. 4 also includes a sensor 409, such as a magnetic sensor, a Hall sensor (e.g., a Hall-effect sensor), a reed switch, a Tunnel Magneto-Resistance (TMR) sensor, or another suitable type of sensor.

During operation of the haptic control system 400, a representation of an input haptic waveform ($X_{ref}$ 410) is optionally input into the haptic control system 400 optionally in response to a first operation performed on or by an electronic device that, with or in response to the first operation, includes a request for associated haptic feedback (e.g., a request to simulate a user's sense of touch, or another sense of the user, via a vibration operation, and/or via another type of haptic feedback operation). For example, $X_{ref}$ 410 optionally includes a first (e.g., reference) representation of the requested haptic feedback, such as parameters of a waveform such as a position waveform (e.g., a displacement waveform) that the electronic devices requests of the haptic generator 408 to generate. In some examples, $X_{ref}$ 410 is stored in a memory accessible (directly or indirectly) by the CL controller 402, and the CL controller 402 reads from the memory. In some examples, CL controller 402 is sent the data for $X_{ref}$ 410 from the memory (e.g., by the processing circuitry, such as host processor 210). In addition to $X_{ref}$ 410, the CL controller 402 optionally receives a representation of an output haptic waveform of the haptic generator ($X_{act}$ 412) during operation of the haptic control system 400. $X_{act}$ 412 optionally corresponds to an actuated haptic waveform (e.g., a position waveform corresponding to movement of the haptic generator 408 during a haptic operation and/or a displacement measurement) of the haptic generator 408 measured by the sensor 409. The CL controller 402 optionally receives additional feedback from the haptic generator 408, such as a measurement of current, represented by I 411 in FIG. 4, through a component of the haptic generator 408 and/or power usage of the haptic generator 408, directly or indirectly, such as via the sensor 409.

The CL controller 402 transmits a second representation of an input haptic waveform ($X_{ref}'$ 414) that is optionally based on $X_{ref}$ 410 and $X_{act}$ 412. In some examples, a first haptic generator and a second haptic generator, though optionally manufactured by a similar entity and/or via a similar process, optionally include different characteristic values, such as resistance values that are introduced during a manufacturing and/or testing process of the haptic generator that may cause the first haptic generator and the second haptic generator to behave differently under similar conditions. For example, a haptic generator of a first type may include a copper coil of a first length and a second haptic generator of the first type may include a copper coil of a second length longer than the first length, which may, for example, result in differences in behaviors (e.g., dynamic characteristics, such as resultant actuations of the respective haptic generator) given the same input actuation voltage, for example, due to manufacturing tolerance. As such, a first haptic control system including a first haptic generator of a first type and a second haptic control system including a second haptic generator of the first type, receiving a similar input $X_{ref}$ 410, may output a different $X_{act}$ 412, which corresponds to a measured and/or reported haptic waveform of the haptic generator 400. Accordingly, in some examples, $X_{ref}'$ 414, which is based at least in part on $X_{act}$ 412, which is based on estimates of the haptic generator, is output by the closed-loop controller 402 instead of, for example, $X_{ref}$ 410, optionally to compensate and/or correct for differences introduced during the manufacturing process or during real-time operation of the haptic control system (e.g., during usage by a user of an electronic device that includes the haptic control system). In some examples, $X_{ref}$ 410 and $X_{ref}'$ 414 are the same. In some examples, $X_{ref}$ 410 and $X_{ref}'$ 414 are different. In some examples, a haptic generator includes two coils, such as in a dual-actuation of the haptic generator where two coils are mounted (instead of a single coil) to improve haptic strength. The two coils may be of the first type and can have a slightly different dynamic characteristics due to manufacturing tolerance. In some examples, when a haptic generator includes two coils, a single sensor, such as the sensor 409 can still be used for detecting $X_{act}$ 412. As such, some disclosed haptic power control techniques are applicable to such examples.

In the illustrated example, $X_{ref}'$ 414 is transmitted to the voltage saturation circuit 404. The voltage saturation circuit 404 receives as inputs $X_{ref}'$ 414 and an actuation voltage limit 416 (e.g., Vlim(k) or Vlim$_0$) for the haptic generator 408. In some examples, the voltage saturation circuit 404 rails the actuation voltage limit 416 for the haptic generator 408. For example, when the actuation voltage limit 416 for the haptic generator 408, as received or computed for the haptic generator 408 at the voltage saturation circuit 404, is below a first threshold actuation voltage limit for the haptic generator 408, the actuation voltage limit 416 for the haptic generator 408 is optionally increased to be at or above the first threshold actuation voltage limit for the haptic generator 408. Similarly, when the actuation voltage limit 416 for the haptic generator 408, as received or computed for the haptic generator 408 at the voltage saturation circuit 404, is above second threshold actuation voltage limit for the haptic generator 408, the actuation voltage limit 416 for the haptic generator 408 is optionally decreased to be at or below the second threshold actuation voltage limit for the haptic generator 408. As such, the voltage saturation circuit 404 optionally controls the peak power consumption of the haptic generator 408.

The actuation voltage limit 416 for the haptic generator 408 is estimated based on a power limit for the haptic system 400 (and/or on a power limit for the haptic generator 408). In some examples, the power management circuitry 209 (FIG. 2) provides the power limit for the haptic system 400 (and/or the power limit for the haptic generator 408) or is able to adjust a power limit for the haptic system 400 (and/or for the haptic generator 408). In some examples, the power management circuitry 209 (FIG. 2) estimates the actuation voltage limit 416 as described herein. In some examples, additional processing circuitry in the haptic control system 400, such as the voltage saturation circuit 404, the CL controller 402, or other processing circuitry estimates the actuation voltage limit 416 for the haptic generator 408 as described herein.

The actuation voltage limit 416 for the haptic generator 408, Vlim(k), is optionally based on (e.g., a function of) an estimate of a resistance of one or more components of the haptic control system, such as of the haptic generator 408, at time k. For example, Vlim(k) is optionally based on one or more resistance measurements 418, represented as R or R(k), optionally measured or detected by the sensor 409 (e.g., a Hall sensor or a Hall-effect sensor, or another type of sensor). For example, the resistance of the sensor 409 is optionally detected (and optionally stored) at an analog front end of the sensor 409, and then used for estimating the actuation voltage limit 416 for the haptic generator 408 for the voltage saturation circuit 404. For ease of description, measurements of sensor 409, such as Rh or Rh(k) further described below, or measurements derived from measurements of sensor 409, such as R or R(k), are used for estimating the actuation voltage limit 416 for the haptic generator 408 for the voltage saturation circuit 404.

In some examples, Vlim(k) is expressed using Expression 1:

$$V\lim(k) = \frac{\hat{R}(k)}{R_0} \sqrt{\frac{R_0 + R_{trace}}{\hat{R}(k) + R_{trace}}} V\lim_0$$

where $\hat{R}(k)$ represents an estimate of a resistivity of a coil of the haptic generator 408 (e.g., a copper coil or another type of coil suitable for a haptic generator) at time k, $R_0$ represents a factory calibrated resistance for the coil, $R_{trace}$ represents a resistance of a trace of the haptic system, and Vlim$_0$ represents an actuation voltage limit for the haptic generator 408 that is factory calibrated at calibration temperature and resistance ($T_0$ and $R_0$, respectively).

In some examples, the estimate of the resistivity of the coil(s) (e.g., a copper coil) of the haptic generator 408 at time k, $\hat{R}(k)$, is expressed using Expression 2:

$$\hat{R}(k) = R_0 \left( 1 + a_c \frac{Rh(k) - Rh_0}{a_h Rh_0} \right)$$

where $R_0$ represents a factory calibrated resistance, Rh(k) represents the one or more resistance measurements 418 of the sensor 409 at time k, Rh$_0$ represents a factory calibrated resistance measurement 418 of the sensor 409, $a_c$ represents a thermal coefficient of the sensor (e.g., from a Hall sensor data sheet), and $a_h$ represents a thermal coefficient of the coil of the haptic generator (e.g., copper thermal coefficient for a copper coil). Thus, in some examples, the estimate of the resistivity of the coil(s) (e.g., a copper coil) of the haptic generator 408 at time k, $\hat{R}(k)$, can be estimated using the one or more resistance measurements 418 of the sensor 409 at time k, Rh(k). Thus, in some examples, the actuation voltage limit 416 for the haptic generator 408, Vlim(k), can be adjusted based on the estimate of the resistivity of the coil(s) (e.g., a copper coil) of the haptic generator 408 at time k, $\hat{R}(k)$, which can be estimated using the one or more resistance measurements 418 of the sensor 409 at time k, Rh(k).

In some examples, $Vlim_0$ is expressed using Expression 3:

$$V\lim_0 = \sqrt{P_{lim} \frac{R_0^2}{R_0 + R_{trace}}} V\lim_0$$

where $P_{lim}$ represents a given power limit for haptic control system 400 (e.g., from power management circuitry 209 of FIG. 2). If the actuation voltage limit is static (e.g., $Vlim_0$) across the range of operating temperatures of the haptic control system 400, such as in a temperature range of −15° C. to 75° C., a power budget of the haptic generator 408 may be exceeded and/or underutilized at extremes of the temperatures, as discussed with reference to FIG. 5. Thus, it is desirable to use a dynamic actuation voltage limit for the haptic generator 408 to better utilize and/or stay within the allotted power budget for the haptic control system 400. In some examples, the power budget for the haptic control system 400 is allotted by system power architecture of, for example, the device that hosts the haptic control system 400, such as the computing system 200 of FIG. 2. For example, the power management circuitry 209 of FIG. 2 can dynamically provide the allotted power to the haptic control system 400, which is optionally constant or dynamic power, based on a current power usage of the device, temperature of the device, feedback from the haptic control system 400 and/or other components regarding how much power should be allotted for a haptic operation to have a meet a threshold haptic strength (e.g., a certain haptic salience strength specification).

Returning to FIG. 4, an output of the voltage saturation circuit 404 is a third representation of a haptic waveform $X_{ref}''$ 420 that is based on $X_{ref}'$ 414 and actuation voltage limit 416. For example, while the haptic control system 400 is operating in a first mode, optionally in which the actuation voltage limit for the haptic generator 408 varies with temperature, $X_{ref}''$ 420 is optionally based on $X_{ref}'$ 414 and Vlim(k), which is based on an estimate of the resistivity of the haptic generator at time k, rather than, for example, merely a factory calibrated resistivity of the haptic generator 408 such as $R_0$ (that was optionally calibrated at a time before operation, and not dependent on time k), and while the haptic control system 400 is operating in a second mode, optionally in which the actuation voltage limit for the haptic generator 408 does not vary with temperature, $X_{ref}''$ 420 is optionally based on $X_{ref}'$ 414 and $Vlim_0$ (or on another actuation voltage limit value for the haptic generator 408 that is constant across a range of temperatures).

In the illustrated example, voltage generator 406 receives $X_{ref}''$ 420 as an input. The voltage generator 406 optionally includes a digital to analog converter (DAC) to generate voltages based on $X_{ref}''$ 420 and an amplifier that amplifies the output of the DAC to generate the actuation voltage, $V_{act}$ 422, for the haptic generator 408. In particular, $V_{act}$ 422 is an actuation voltage that causes the haptic generator 408 to actuate in accordance with a haptic waveform to generate a haptic output (e.g., for an alert or notification). $V_{act}$ 422 is optionally within a threshold actuation voltage limit for the haptic generator 408 set by the voltage saturation circuit 404 (e.g., within Vlim(k) and/or $Vlim_0$ and optionally at, above, or below a voltage saturation threshold). In some examples, the sensor 409 periodically or continuously reports $X_{act}$ 412 and the haptic power control technique described herein is implemented as described herein in a periodic or continuous manner.

It should be noted that in some examples, the CL controller 402 and the voltage saturation circuit 404 is implemented in software and/or firmware executed by processing circuitry (e.g., a haptic controller dedicated for the haptic control system 400 or other processing circuitry in computing system 200).

Figure 5:
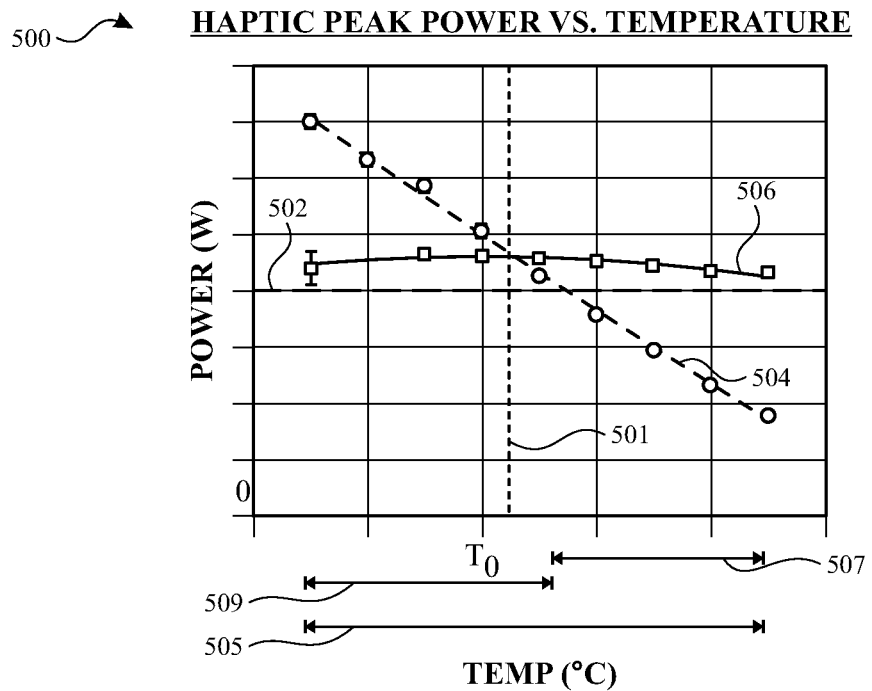
FIG. 5 illustrates a graph of haptic peak power versus temperature in accordance with some examples of the present disclosure.

FIG. 5 illustrates a graph 500 of haptic peak power (e.g., a peak power of performance) of a haptic generator such as the haptic generator 408 of FIG. 4 versus temperature in accordance with some examples of the present disclosure. In graph 500, a vertical line 501 represents calibration temperature $T_0$ (at which $Vlim_0$ is determined), a horizontal line 502 represents a power budget of a haptic generator, a curve 504 represents a utilized amount of peak power of the haptic generator when the actuation voltage limit for the haptic generator 408, for example, is constant (e.g., $Vlim_0$) over a first temperature range 505, such as a temperature range of −15° C. to 75° C., or another temperature range, and a curve 506 represents a utilized amount of peak power of the haptic generator when the actuation voltage limit is configurable and/or variable over the first temperature range 505. As shown, following the pattern given by the curve 504, when the actuation voltage limit is constant (e.g., does not vary with a measured resistivity or estimate of a resistivity corresponding to the haptic generator) and the temperature is above the calibration temperature represented by the vertical line 501 (or above a threshold temperature that is above the calibration temperature), the haptic peak power performance is under-budget (e.g., 5, 8, 10, 20, 30 percent or another percentage under the power budget) over a second temperature range 507 that is optionally a first subset temperature range of the first temperature range 505. The second temperature range 507 is optionally from the calibration temperature $T_0$ to the upper bound of the first temperature range 505 (e.g., the upper bound of the device operating specification). In some examples, the haptic peak power performance is under-budget due to a relatively higher resistivity of coil(s) of the haptic generator at higher temperatures. The under-utilized power of the haptic generator may result in a non-optimal haptic performance (e.g., strength) of a desired haptic operation. Also, as shown, following the curve 504, when the actuation voltage limit is constant (e.g., does not vary with a measured resistivity or estimate of a resistivity corresponding to the haptic generator), and the temperature is below the calibration temperature represented by the vertical line 501 (or below a threshold temperature that is below the calibration temperature, the haptic peak power performance is over-budget (e.g., 5, 8, 10, 20 30 percent or another percentage over the power budget) over a third temperature range 509 that is optionally a second subset temperature range of the first temperature range 505. The third temperature range is optionally from a lower bound of the first temperature range 505 (e.g., the lower bound of the device operating specification) to the calibration temperature $T_0$. In some examples, the haptic power performance is over budget due to a relatively lower resistivity of coil(s) of the haptic generator (e.g., lower than a resistivity of the coil(s) estimated at factory). The over-utilized power of the haptic generator may result in a battery brown-out (e.g., a higher amplifier brown-out risk under battery impedance) or excessive power consumption by the haptic control system 400.

In some examples, a disclosed haptic power control technique provides consistent power control for the haptic generator, such as illustrated by the curve 506. As such, when the actuation voltage limit is variable (e.g., varies with a measured resistivity or estimate of a resistivity corresponding to the haptic generator) over a temperature range, such as the first temperature range 505, the second temperature range 507, or the third temperature range 509, the peak power utilized by the haptic generator is optionally consistent (e.g., within an acceptable performance range, such as within 2, 3, 5, 10, 12 percent, or another percentage of the allowable power budget (e.g., horizontal line 502)). In some examples, a disclosed haptic power control technique for a haptic system is configured to be enabled over the first temperature range 505, or over a subset of the first temperature range 505, such as the second temperature range and/or the third temperature range.

It should be noted that the temperature dimension of the graph 500 (or graph 600 discussed later in this disclosure) optionally corresponds to a resistivity of the haptic generator. For example, a thermal resistivity of the haptic generator (e.g., an estimated coil thermal resistivity) optionally decreases as temperature decreases and a thermal resistivity of the haptic generator optionally increases as temperature increases. This thermal relationship underlies Expressions 1-3 above for dynamically adjusting the actuation voltage limit for the haptic generator.

Figure 6:
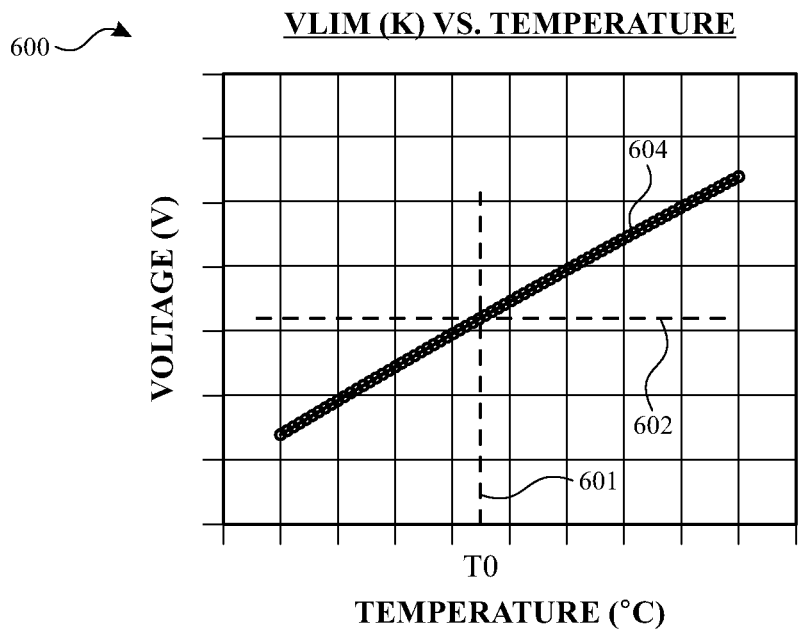
FIG. 6 illustrates a graph of actuation voltage limit versus temperature in accordance with some examples of the present disclosure.

FIG. 6 illustrates a graph 600 of actuation voltage limit (e.g., an actuation voltage limitation) for a haptic generator versus temperature, in accordance with some examples of the present disclosure. In graph 600, a vertical line 601 represents calibration temperature, a horizontal line 602 represents a constant actuation voltage limit (e.g., $Vlim_0$) over a temperature range (e.g., the actuation voltage limit does not vary with a measured resistivity or estimate of a resistivity corresponding to the haptic generator), and a curve 604 represents an actuation voltage limit (e.g., Vlim (k)) for the haptic generator that adapts with temperature (e.g., varies with a measured resistivity or estimate of a resistivity corresponding to the haptic generator). As illustrated, when the haptic control system is operating in accordance with an adaptive actuation voltage limit for the haptic generator, the actuation voltage limit for the haptic generator optionally decreases as temperature decreases below the calibration temperature represented by the vertical line 601 and increases as temperature increases beyond the calibration temperature represented by the vertical line 601. Given Expressions 1-3 discussed in this disclosure, in some examples, curve 604 illustrates an approximation of Vlim (k), where k is a time unit, as a function of temperature, where the approximation is represented by Expression 4:

$$Vlim(k) \approx \sqrt{P_{lim} R(k)}.$$

Further Discussion Of Some Examples

Figure 7:
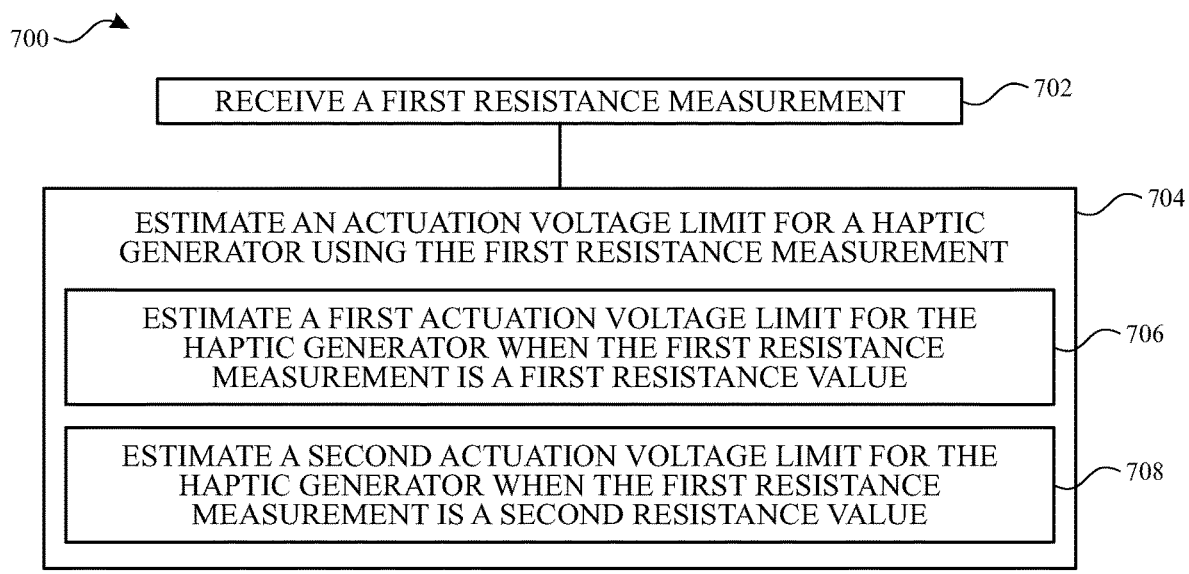
FIG. 7 illustrates a flowchart of a method of a haptic power control technique in accordance with some examples of the present disclosure.

FIG. 7 illustrates a flowchart of a method 700 that implements a haptic power control technique, in accordance with some examples of the present disclosure. In some examples, the method 700 is performed at an electronic device that includes a haptic generator, such as one of the exemplary electronic devices of FIGS. 1A-1E, the computing system 200, the electronic device 300, or another type of electronic device.

The method 700 includes receiving (operation 702) a first resistance measurement, such as a resistance measurement R 418 measured or obtained by the sensor 409 of FIG. 4 (e.g., derived from a measurement of the sensor 409).

The method 700 includes estimating or computing (operation 704) an actuation voltage limit for the haptic generator using the first resistance measurement, such as an actuation voltage limit 416 for the haptic generator 408 using R 418 of FIG. 4. Estimating or computing the actuation voltage limit using the first resistance measurement includes, when the first resistance measurement is a first resistance value, estimating or computing (operation 706) a first actuation voltage limit for the haptic generator, such as in accordance with Expression 1 or Expression 3, and when the first resistance measurement is a second resistance value, estimating or computing (operation 708) a second actuation voltage limit for the haptic generator, such as in accordance with Expression 1 or Expression 3.

In some examples, estimating or computing the actuation voltage limit for the haptic generator using the first resistance measurement includes: estimating a first coil resistance value of the haptic generator using the first resistance measurement when the first resistance measurement is the first resistance value, and estimating a second coil resistance value of the haptic generator using the first resistance measurement when the first resistance measurement is the second resistance value, such as in accordance with Expression 2.

In some examples, the method 700 includes, receiving a second resistance measurement, such as a resistance measurement R 418 measured or obtained by the sensor 409 of FIG. 4 and estimating or computing the actuation voltage limit for the haptic generator using the second resistance measurement, such as in accordance with Expression 1 or Expression 3, wherein estimating or computing the actuation voltage limit for the haptic generator using the second resistance measurement includes: estimating or computing a third actuation voltage limit for the haptic generator when the second resistance measurement is a third resistance value, such as in accordance with Expression 1 or Expression 3, and estimating or computing a fourth actuation voltage limit for the haptic generator, different from the third actuation voltage limit, when the second resistance measurement is a fourth resistance value, such as in accordance with Expression 1 or Expression 3.

In some examples, the first actuation voltage limit for the haptic generator and the second actuation voltage limit for the haptic generator are equal, such as when the actuation voltage limit is constant (e.g., independent of temperature threshold or of a resistivity threshold of the haptic generator), such as the illustrated with the horizontal line 602 of FIG. 6.

In some examples, the first actuation voltage limit for the haptic generator and the second actuation voltage limit for the haptic generator are equal when a temperature of the haptic generator is above a threshold temperature, such as at a threshold temperature that is above the vertical line 601 of FIG. 6, and/or optionally, more generally, in accordance with a determination that one or more criteria is satisfied, optionally including a criterion that is based on an estimated resistivity of the haptic generator. For example, the electronic device optionally operates in a first mode in which the first actuation voltage limit for the haptic generator and the second actuation voltage limit for the haptic generator are not equal when a temperature of the haptic generator is below a threshold temperature and then, in response to satisfaction of the one or more criteria, the electronic device optionally operates in a second mode in which the first actuation voltage limit for the haptic generator and the second actuation voltage limit for the haptic generator are equal when a temperature of the haptic generator is above a threshold temperature.

In some examples, the first actuation voltage limit for the haptic generator is different from the second actuation voltage limit for the haptic generator (e.g., independent of temperature threshold or of a resistivity threshold of the haptic generator), such as illustrated by the curve 604 of FIG. 6.

In some examples, the first actuation voltage limit for the haptic generator is different from the second actuation voltage limit for the haptic generator when a temperature of the haptic generator is below a threshold temperature, such as at a threshold temperature that is below the vertical line 601 of FIG. 6, and/or optionally, more generally, in accordance with a determination that one or more criteria is satisfied, optionally including a criterion that is based on an estimated resistivity of the haptic generator. For example, the electronic device optionally operates in a first mode in which the first actuation voltage limit for the haptic generator is different from the second actuation voltage limit for the haptic generator when a temperature of the haptic generator is below a threshold temperature and then, in response to satisfaction of the one or more criteria, the electronic device optionally operates in a second mode in which the first actuation voltage limit for the haptic generator and the second actuation voltage limit for the haptic generator are equal when a temperature of the haptic generator is above a threshold temperature.

In some examples, the first resistance measurement (e.g., Rh(k) of Expression 2) is detected using a Hall sensor, such as the sensor 409 of FIG. 4.

In some examples, the method 700 includes operating the haptic generator using the estimated or computed actuation voltage limit for the haptic generator, such as applying $V_{act}$ 422 of FIG. 4 to the haptic generator 408 based on the estimated actuation voltage limit for the haptic generator.

In some examples, a system (e.g., a haptic power control system) includes a haptic generator (e.g., the haptic generator 408 of FIG. 4) and processing circuitry (e.g., circuitry of the haptic system 258 of FIG. 2, of haptic system 314 of FIG. 3, of the haptic control system 400 of FIG. 4, or of other suitable circuitry) configured to perform operations including any, some, or all of the operations described with reference to the method 700, and more generally, any operation regarding a disclosed haptic power control technique.

In some examples, the system includes a voltage generator (e.g., the voltage generator 406 of FIG. 4) configured to supply a voltage input to the haptic generator (e.g., $V_{act}$ 422 of FIG. 4), wherein the voltage input to the haptic generator comprises the first actuation voltage limit for the haptic generator or the second actuation voltage limit for the haptic generator. In some examples, the voltage input to the haptic generator comprises a voltage that is less than the first actuation voltage limit for the haptic generator. In some examples, the voltage input to the haptic generator comprises a voltage that is less than the second actuation voltage limit for the haptic generator. In some examples, the voltage saturation circuit 404 controls the peak power consumption of the haptic generator.

In some examples, the system includes a Hall sensor (e.g., the sensor 409 of FIG. 4) configured to detect the first resistance measurement.

In some examples, the system includes a Hall sensor (e.g., the sensor 409 of FIG. 4) and the processing circuitry comprises a closed-loop controller (e.g., CL controller 402 of FIG. 4) configured to receive a representation of an input haptic waveform (e.g., $X_{ref}$ 410 of FIG. 4) and a representation of an output haptic waveform of the haptic generator (e.g., $X_{act}$ 412 of FIG. 4), different from the representation of the input haptic waveform, from the Hall sensor. In some examples, the processing circuitry comprises a voltage saturation circuit (e.g., voltage saturation circuit 404 of FIG. 4) communicatively coupled between the closed-loop controller and the haptic generator (e.g., the haptic generator 408 of FIG. 4), wherein the voltage saturation circuit is configured to limit a voltage applied to the haptic generator. In some examples, the closed-loop controller (e.g., CL controller 402 of FIG. 4) is configured to transmit an input (e.g., a second representation of an input haptic waveform ($X_{ref}'$ 414 of FIG. 4)) to the voltage saturation circuit, wherein the input to the voltage saturation circuit is based on the representation of the input haptic waveform and the representation of the output haptic waveform of the haptic generator.

In some examples, a non-transitory computer readable storage medium storing one or more programs, the one or more programs comprising instructions, which when executed by processing circuitry of an electronic device including a haptic generator, cause the electronic device to perform operations including any, some, or all of the operations described with reference to the method 700, and more generally, any operation regarding a disclosed haptic power control technique.

In some examples, one or more of the operations described above with reference to the method 700 may be performed in different orders. Also, it should be noted that, the features of the examples discussed in this section, and more generally, the features discussed throughout this disclosure, may be combined in one or more ways. In addition, some examples may include any, some, or all features discussed.

Further, various aspects of the disclosed examples, such as aspects of the examples illustrated in the drawings and details in this disclosed may be combined. In addition, although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:
1. A method comprising:
   at an electronic device including a haptic generator:
      receiving a first resistance measurement; and
      estimating an actuation voltage limit for the haptic generator using the first resistance measurement, wherein estimating the actuation voltage limit for the haptic generator using the first resistance measurement includes:
         estimating a first actuation voltage limit for the haptic generator when the first resistance measurement is a first resistance value; and estimating a second actuation voltage limit for the haptic generator when the first resistance measurement is a second resistance value.

2. The method of claim 1, wherein:
estimating the actuation voltage limit for the haptic generator using the first resistance measurement includes:
estimating a first coil resistance value of the haptic generator using the first resistance measurement when the first resistance measurement is the first resistance value; and
estimating a second coil resistance value of the haptic generator using the first resistance measurement when the first resistance measurement is the second resistance value.

3. The method of claim 1, comprising:
receiving a second resistance measurement; and
estimating the actuation voltage limit for the haptic generator using the second resistance measurement, wherein estimating the actuation voltage limit for the haptic generator using the second resistance measurement includes:
estimating a third actuation voltage limit for the haptic generator when the second resistance measurement is a third resistance value; and
estimating a fourth actuation voltage limit for the haptic generator, different from the third actuation voltage limit, when the second resistance measurement is a fourth resistance value.

4. The method of claim 1, wherein the first actuation voltage limit for the haptic generator and the second actuation voltage limit for the haptic generator are equal.

5. The method of claim 1, wherein the first actuation voltage limit for the haptic generator and the second actuation voltage limit for the haptic generator are equal when a temperature of the haptic generator is above a threshold temperature.

6. The method of claim 1, wherein the first actuation voltage limit for the haptic generator is different from the second actuation voltage limit for the haptic generator.

7. The method of claim 1, wherein the first actuation voltage limit for the haptic generator is different from the second actuation voltage limit for the haptic generator when a temperature of the haptic generator is below a threshold temperature.

8. The method of claim 1, wherein the first resistance measurement is detected using a Hall sensor.

9. The method of claim 1, comprising operating the haptic generator using the estimated actuation voltage limit for the haptic generator.

10. A system comprising:
a haptic generator; and
processing circuitry configured to perform operations comprising:
receiving a first resistance measurement; and
estimating an actuation voltage limit for the haptic generator using the first resistance measurement, wherein estimating the actuation voltage limit for the haptic generator using the first resistance measurement includes:
estimating a first actuation voltage limit for the haptic generator when the first resistance measurement is a first resistance value; and
estimating a second actuation voltage limit for the haptic generator when the first resistance measurement is a second resistance value.

11. The system of claim 10, comprising:
a voltage generator configured to supply a voltage input to the haptic generator, wherein the voltage input to the haptic generator comprises the first actuation voltage limit for the haptic generator or the second actuation voltage limit for the haptic generator.

12. The system of claim 10, comprising a Hall sensor configured to detect the first resistance measurement.

13. The system of claim 10, comprising a Hall sensor, wherein the processing circuitry comprises a closed-loop controller configured to receive:
a representation of an input haptic waveform; and
a representation of an output haptic waveform of the haptic generator, different from the representation of the input haptic waveform, from the Hall sensor.

14. The system of claim 13, wherein the processing circuitry comprises a voltage saturation circuit communicatively coupled between the closed-loop controller and the haptic generator, wherein the voltage saturation circuit is configured to limit a voltage applied to the haptic generator.

15. The system of claim 14, wherein the closed-loop controller is configured to:
transmit an input to the voltage saturation circuit, wherein the input to the voltage saturation circuit is based on the representation of the input haptic waveform and the representation of the output haptic waveform of the haptic generator.

16. The system of claim 10, wherein:
estimating the actuation voltage limit for the haptic generator using the first resistance measurement includes:
estimating a first coil resistance value of the haptic generator using the first resistance measurement when the first resistance measurement is the first resistance value; and
estimating a second coil resistance value of the haptic generator u sing the first resistance measurement when the first resistance measurement is the second resistance value.

17. The system of claim 10, wherein the operations comprise:
receiving a second resistance measurement; and
estimating the actuation voltage limit for the haptic generator using the second resistance measurement, wherein estimating the actuation voltage limit for the haptic generator using the second resistance measurement includes:
estimating a third actuation voltage limit for the haptic generator when the second resistance measurement is a third resistance value; and
estimating a fourth actuation voltage limit for the haptic generator, different from the third actuation voltage limit, when the second resistance measurement is a fourth resistance value.

18. The system of claim 10, wherein the first actuation voltage limit for the haptic generator is different from the second actuation voltage limit for the haptic generator.

19. A non-transitory computer readable storage medium storing one or more programs, the one or more programs comprising instructions, which when executed by processing circuitry of an electronic device including a haptic generator, cause the electronic device to perform a method comprising:
receiving a first resistance measurement; and
estimating an actuation voltage limit for the haptic generator using the first resistance measurement, wherein estimating the actuation voltage limit for the haptic generator using the first resistance measurement includes:
  estimating a first actuation voltage limit for the haptic generator when the first resistance measurement is a first resistance value; and
  estimating a second actuation voltage limit for the haptic generator when the first resistance measurement is a second resistance value.

20. The non-transitory computer readable storage medium storing of claim 19, wherein the first actuation voltage limit for the haptic generator is different from the second actuation voltage limit for the haptic generator when a temperature of the haptic generator is below a threshold temperature.

* * * * *